*N. Johnson,*
*Water Wheel,*
*N⁰ 85,100.*            *Patented Dec. 22, 1868.*
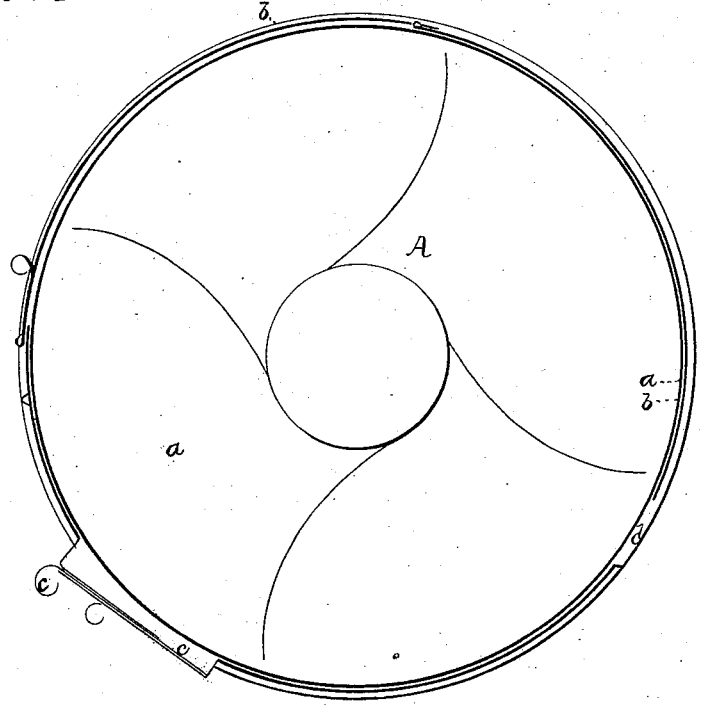
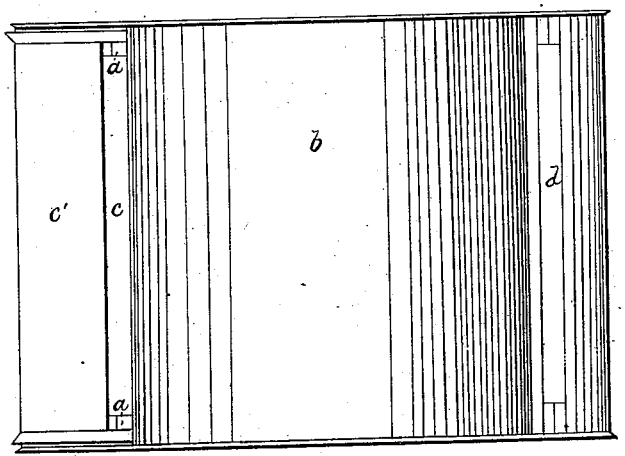
Witnesses.
W. Kilmer
C. D. Brown.
Inventor.
Nathan Johnson
Inventor by
Geo. E. Brown
Atty

NATHAN JOHNSON, OF DECATUR, MICHIGAN.

Letters Patent No. 85,100, dated December 22, 1868.

IMPROVED WATER-WHEEL.

The Schedule referred to in these Letters Patent and making part of the same.

*To all whom it may concern:*

Be it known that I, NATHAN JOHNSON, of Decatur, in the State of Michigan, have invented a new and useful Improvement in Water-Wheels; and I do hereby declare that the following is a full, clear, and exact description of the same, reference being had to the accompanying drawings, and letters of reference marked thereon, making a part of this specification, in which—

Figure 1 is a vertical section of my invention.

This invention consists in providing a water-wheel with a casing, in which there is but one opening, near the bottom, for the ingress of water, and another, also near the bottom, for its egress, so that if the wheel be placed where a current of water strikes the lower part of its casing, it will revolve, and this, too, even if the upper portion of the casing be submerged in still water, as will hereinafter more fully appear.

To enable those skilled in the art to make and use my invention, I now proceed to describe its construction and operation.

Similar letters, in the drawings, refer to like parts.

A represents a water-wheel of ordinary construction, the axis of which has its bearings in two vertical and parallel disks, $a\ a$, of any suitable material, and of a diameter a trifle greater than that of the wheel.

The disks $a$ are soldered into the ends of a sheet-metal tube, $b$, surrounding the wheel A, said tube and disks forming a casing for the wheel.

The tube $b$ may be made in two or more parts, whereof one part, $b'$, may be hinged at one end, so as to be turned back, leaving an opening in the casing for the repair or adjustment of the wheel.

Near the bottom of the casing I make an opening or mouth, $c$, which I fit with a slide, $c'$, through which opening water may enter when the slide is opened.

At a short distance from the mouth $c$, I make another opening, $d$, in the casing, for the egress of water.

This wheel and casing are intended to be placed where a current of water may enter the mouth $c$, and flow out of the opening, $d$, rotating the wheel during its passage through the box.

As there is but one passage whereby water may find entrance, it is immaterial what the depth of water may be where the casing is placed, provided only there is a current flowing into the casing, and thus preventing the still water from gaining access to stop the wheel.

Having thus described my invention,

What I claim as new, and desire to secure by Letters Patent, is—

The arrangement of the horizontal wheel A', and cylindrical case $a\ b$, provided with a single inlet, $c$, and a single outlet, $d$, both orifices being arranged in the lower side of the case, opposite to each other, and the inlet being provided with a slide or other gate, $c'$, substantially as and for the purposes herein described.

NATHAN JOHNSON.

Witnesses:
  CHAS. E. GALLIGAR,
  WILLIAM H. TUCKER.